(12) United States Patent
Suzuki et al.

(10) Patent No.: US 11,255,378 B2
(45) Date of Patent: Feb. 22, 2022

(54) BALL ARRANGEMENT METHOD FOR BALL BEARING, BALL BEARING MANUFACTURING METHOD AND MANUFACTURING DEVICE, AND MACHINE AND VEHICLE MANUFACTURING METHOD

(71) Applicant: NSK LTD., Tokyo (JP)

(72) Inventors: Takahiro Suzuki, Fujisawa (JP); Kouhei Dobashi, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/051,605

(22) PCT Filed: Dec. 11, 2018

(86) PCT No.: PCT/JP2018/045540
§ 371 (c)(1),
(2) Date: Oct. 29, 2020

(87) PCT Pub. No.: WO2019/230023
PCT Pub. Date: Dec. 5, 2019

(65) Prior Publication Data
US 2021/0222731 A1 Jul. 22, 2021

(30) Foreign Application Priority Data
May 30, 2018 (JP) .............................. JP2018-103734

(51) Int. Cl.
*F16C 19/06* (2006.01)
*F16C 43/06* (2006.01)
(Continued)

(52) U.S. Cl.
CPC ............ *F16C 19/06* (2013.01); *B23P 15/003* (2013.01); *B23P 19/04* (2013.01); *F16C 43/06* (2013.01)

(58) Field of Classification Search
CPC .......... F16C 19/06; F16C 43/04; F16C 43/06; F16C 33/32; B23P 15/003; Y10T 29/49682; Y10T 29/53104
See application file for complete search history.

(56) References Cited

U.S. PATENT DOCUMENTS

| 838,303 | A | * | 12/1906 | Conrad | ................... F16C 43/04 |
| | | | | | 29/898.061 |
| 942,392 | A | * | 12/1909 | Koch | ...................... F16C 43/06 |
| | | | | | 384/511 |

(Continued)

FOREIGN PATENT DOCUMENTS

| GB | 2058243 A * 4/1981 | ............ F16C 33/585 |
| JP | 49-34209 B 9/1974 | |

(Continued)

OTHER PUBLICATIONS

Search Report dated Nov. 2, 2020 by the European Patent Office in counterpart European Patent Application No. 18920416.7.

(Continued)

*Primary Examiner* — Phillip A Johnson
(74) *Attorney, Agent, or Firm* — Sughrue Mion, PLLC

(57) ABSTRACT

A ball arranging method for a ball bearing includes in this order a ball inserting step of inserting a plurality of balls into one region along a circumferential direction of an annular space formed between an inner ring and an outer ring, a flow stopping step of placing a flow stopping jig on a circumferentially outer side of the one region in the annular space so as to hold the inserted balls within the one region, and a ball separating step of sequentially inserting, in an axial direction, tip ends of a plurality of working arrows protruding correspondingly to a number of the balls between the balls while the flow stopping jig is removed from the annular space from a state of being placed in the annular space, so (Continued)

as to arrange the balls at equal intervals in the circumferential direction.

21 Claims, 14 Drawing Sheets

(51) Int. Cl.
*B23P 15/00* (2006.01)
*B23P 19/04* (2006.01)

(56) References Cited

U.S. PATENT DOCUMENTS

| | | | | |
|---|---|---|---|---|
| 1,048,758 | A * | 12/1912 | Sultemeyer | F16C 43/08 |
| | | | | 29/898.062 |
| 1,074,228 | A * | 9/1913 | Whitney | F16C 19/06 |
| | | | | 29/724 |
| 3,340,590 | A * | 9/1967 | Reynolds | F16C 43/06 |
| | | | | 29/714 |
| 5,421,088 | A * | 6/1995 | Kawamura | F16C 43/06 |
| | | | | 29/898.062 |
| 2008/0163479 | A1 * | 7/2008 | Yagi | F16C 43/06 |
| | | | | 29/724 |
| 2017/0314622 | A1 * | 11/2017 | Akanuma | B23P 19/04 |

FOREIGN PATENT DOCUMENTS

| | | | |
|---|---|---|---|
| JP | 59-47525 A | 3/1984 | |
| JP | 2-266113 A | 10/1990 | |
| JP | 07290329 A * | 11/1995 | ............. F16C 43/06 |
| JP | 9-225757 A | 9/1997 | |
| JP | 2006-200630 A | 8/2006 | |
| JP | 2008-200789 A | 9/2008 | |

OTHER PUBLICATIONS

International Search Report (PCT/ISA/210) dated Jan. 29, 2019 by the International Searching Authority in counterpart International Patent Application No. PCT/JP2018/045540.
Written Opinion (PCT/ISA/237) dated Jan. 29, 2019 by the International Searching Authority in counterpart International Patent Application No. PCT/JP2018/045540.

* cited by examiner

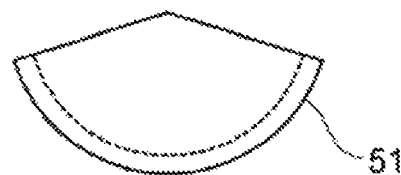
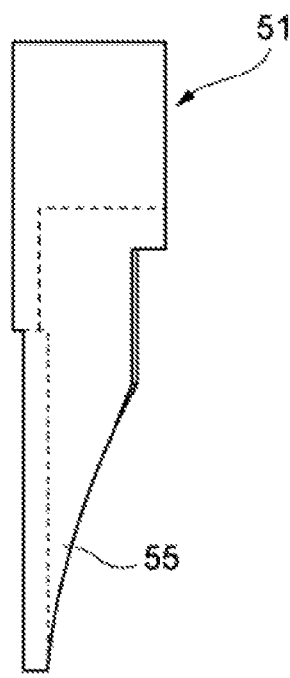
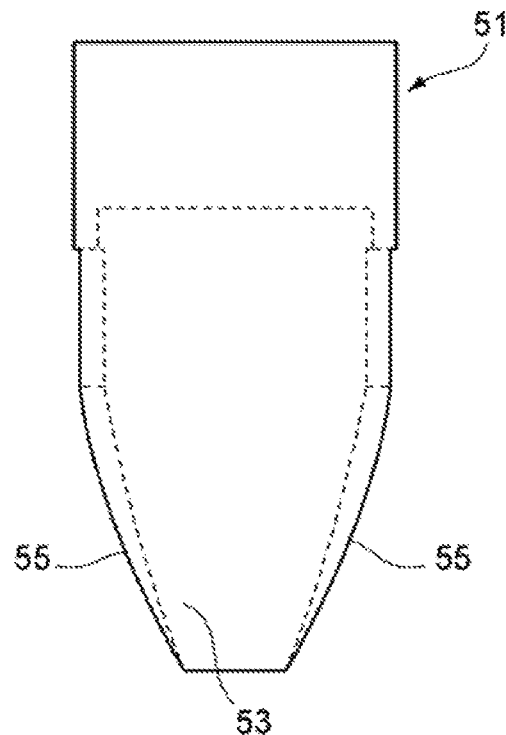
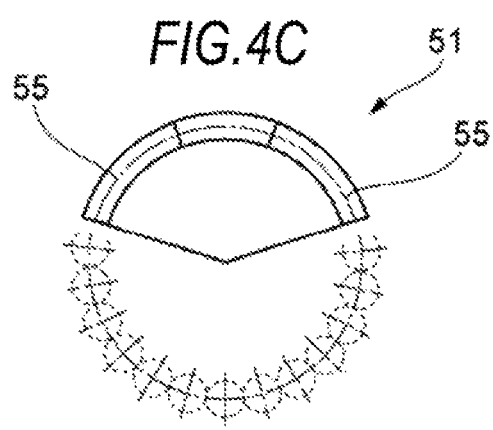

BALL ARRANGEMENT METHOD FOR BALL BEARING, BALL BEARING MANUFACTURING METHOD AND MANUFACTURING DEVICE, AND MACHINE AND VEHICLE MANUFACTURING METHOD

CROSS-REFERENCE TO RELATED APPLICATIONS

This application is a National Phase Entry of PCT International Application No. PCT/JP2018/045540 filed Dec. 11, 2018, which claims priority to Japanese Patent Application No. 2018-103734 filed May 30, 2018.

TECHNICAL FIELD

The present invention relates to a ball arranging method for a ball bearing, a manufacturing method and manufacturing apparatus for a ball bearing, and manufacturing methods for a machine and a vehicle.

BACKGROUND ART

As a technique for arranging a plurality of balls at equal intervals between inner and outer rings of a ball bearing, for example, there is a method disclosed in Patent Document 1. In this method, a plurality of balls placed between inner and outer rings are collected in one region in a circumferential direction, and the collected balls are distributed into three regions in the circumferential direction between the inner and outer rings. Then, a plurality of working arrows are sequentially inserted in an axial direction between each of the plurality of balls distributed to the respective regions, so that the plurality of balls are arranged at equal intervals in the circumferential direction.

PRIOR ART DOCUMENT

Patent Document

Patent Document 1: JP-A-2008-200789

SUMMARY OF INVENTION

Technical Problem

In the above ball arranging method, a ball collecting step of collecting the plurality of balls placed between the inner and outer rings in one region in the circumferential direction is additionally performed between a ball inserting step of inserting the balls between the inner and outer rings and a ball separating step of arranging the balls at equal intervals in the circumferential direction. Further, since the ball inserting step, the ball collecting step and the ball separating step are performed at different positions, it is necessary to convey a workpiece to a next step after the ball inserting step. That is, since the above-described ball arranging technique requires a larger number of steps and time for conveyance between the steps, improvement in workability is desired.

Accordingly, an object of the present invention is to provide a ball arranging method for a ball bearing, a manufacturing method and manufacturing apparatus for a ball bearing, and manufacturing methods for a machine and a vehicle, which can improve workability of ball arranging work of placing and arranging balls between inner and outer rings at equal intervals.

Solution to Problem (1) A ball arranging method for a ball bearing includes:
a ball inserting step of inserting a plurality of balls into one region along a circumferential direction of an annular space formed between an inner ring and an outer ring;
a flow stopping step of placing a flow stopping jig on a circumferentially outer side of the one region in the annular space so as to hold the inserted plurality of balls within the one region; and
a ball separating step of sequentially inserting, in an axial direction, tip ends of a plurality of working arrows provided to protrude correspondingly to a number of the balls between the plurality of balls while the flow stopping jig is removed from the annular space from a state of being placed in the annular space, so as to arrange the plurality of balls at equal intervals in the circumferential direction,
wherein the ball inserting step, the flow stopping step and the ball separating step are performed in this order.

According to this ball arranging method for a ball bearing, the ball inserting step of inserting the plurality of balls into the one region along the circumferential direction of the annular space and the ball separating step of arranging the balls at equal intervals in the circumferential direction by the working arrows are continuously performed, so that a ball collecting step of collecting the balls inserted into the annular space in the ball inserting step in one place can be omitted. Therefore, operations for the ball arranging work in a ball bearing can be reduced to improve the workability. Further, ball rubbing in the ball collecting step can be avoided, so that the risk of a ball scratch can be reduced. In addition, the steps from the ball inserting step to the ball separating step are continuously performed, so that the assembling can be easily performed even for a ball bearing without a deformation margin in which the balls are held between the inner ring and the outer ring.

(2) In the ball arranging method for a ball bearing according to (1), in the ball inserting step, the inner ring is moved to a side opposite to the one region with respect to the outer ring, so that the annular space is enlarged radially in the one region before the balls are inserted.

According to this ball arranging method for a ball bearing, the inner ring is moved to a side opposite to the one region with respect to the outer ring, so that the annular space is enlarged radially in the one region before the balls are inserted. Accordingly, the balls can be smoothly inserted into the annular space.

(3) In the ball arranging method for a ball bearing according to (1) or (2), in the flow stopping step, the flow stopping jig is inserted into the annular space along the axial direction of the inner ring and the outer ring.

According to this ball arranging method for a ball bearing, the movement of the inserted balls collected in the one region can be restricted by the flow stopping jig so as to suppress the spread of the balls. Accordingly, the balls inserted into the annular space can be separated in a state of being held in one place without spreading.

(4) In the ball arranging method for a ball bearing according to any one of (1) to (3), in the ball inserting step, the inner ring and the outer ring are inclined with respect to a horizontal plane with the one region upward.

According to this ball arranging method for a ball bearing, the balls inserted in the one region of the annular space are moved downward due to their own weight and arranged in order. Accordingly, the ball inserting step can be smoothly performed.

(5) In the ball arranging method for a ball bearing according to any one of (1) to (4), steps from the ball inserting step to the ball separating step are continuously performed without horizontally conveying the inner ring and the outer ring.

According to this ball arranging method for a ball bearing, the spread of the balls during the horizontal conveyance can be avoided, and the workability can be improved.

(6) A ball arranging method for a ball bearing includes:

decentering a center of an inner ring with respect to a center of an outer ring to enlarge one region along a circumferential direction of an annular space formed between the inner ring and the outer ring;

inclining the outer ring and the inner ring with a side opposite to a side on which the inner ring is decentered upward, and inserting a plurality of balls into the one region of the annular space;

inserting a flow stopping jig into the annular space to hold the plurality of balls within the one region while returning the outer ring and the inner ring horizontally; and inserting a plurality of working arrows provided to protrude correspondingly to a number of the balls, between the plurality of balls while removing the flow stopping jig from the annular space.

According to this ball arranging method for a ball bearing, the ball inserting and the ball separating by the working arrows are continuously performed, so that a ball collecting step of collecting the plurality of balls inserted in the annular space by the ball inserting within one place can be omitted. Therefore, operations for the ball arranging work in a ball bearing can be reduced to improve the workability. Further, ball rubbing in the ball collecting step can be avoided, so that the risk of a ball scratch can be reduced. In addition, steps from the ball inserting to the ball separating are continuously performed, so that the assembling can be easily performed even for a ball bearing without a deformation margin in which the balls are held between the inner ring and the outer ring.

(7) A manufacturing method for a ball bearing in which a plurality of balls are arranged at equal intervals in an annular space between an inner ring and an outer ring uses the ball arranging method according to any one of (1) to (6).

According to this manufacturing method for a ball bearing, a ball bearing in which the balls are arranged at equal intervals in a circumferential direction in the annular space between the inner ring and the outer ring can be easily manufactured.

(8) A manufacturing apparatus for a ball bearing includes:

a workpiece holding table that is configured to hold an inner ring and an outer ring such that an annular space is formed between the inner ring and the outer ring;

a ball inserting mechanism that is configured to insert a plurality of balls into one region along a circumferential direction of the annular space formed between the inner ring and the outer ring which are held by the workpiece holding table;

a flow stopping mechanism that is configured to place a flow stopping jig on a circumferentially outer side of the one region in the annular space so as to hold the plurality of balls which are inserted within the one region; and a ball separating member that includes a plurality of working arrows provided to protrude correspondingly to a number of the balls and is configured such that tip ends of the plurality of working arrows are sequentially inserted in an axial direction between the plurality of balls while removing the flow stopping jig from the annular space from a state of being placed in the annular space, so as to arrange the plurality of balls at equal intervals in the circumferential direction.

According to this manufacturing apparatus for a ball bearing, a ball inserting step of inserting the plurality of balls into one region along the circumferential direction of the annular space by the ball inserting mechanism and a ball separating step of arranging the balls at equal intervals in the circumferential direction by the working arrows of the ball separating member can be continuously performed. Accordingly, it is possible to omit the ball collecting step of collecting the balls inserted into the annular space in the ball inserting step in one place. Therefore, operations for the ball arranging work in a ball bearing can be reduced to improve the workability. Further, ball rubbing in the ball collecting step can be avoided, so that the risk of a ball scratch can be reduced. In addition, steps from the ball inserting to the ball separating are continuously performed, so that the assembling can also be easily performed for a ball bearing without a deformation margin in which the balls are held between the inner ring and the outer ring.

(9) The manufacturing apparatus for a ball bearing according to (8), further includes: an inner ring moving mechanism that is configured to move the inner ring to a side opposite to the one region with respect to the outer ring so as to enlarge the annular space radially in the one region.

According to this manufacturing apparatus for a ball bearing, the one region of the annular space is enlarged radially, so that the balls can be easily inserted into the annular space, and the workability can be further improved.

(10) The manufacturing apparatus for a ball bearing according to (8) or (9), further includes: an inclining operation mechanism that is configured to incline a vertical plane with respect to an axial direction of the inner ring and the outer ring held on the workpiece holding table.

According to this manufacturing apparatus for a ball bearing, the balls inserted in the one region of the annular space are moved downward due to their own weight and arranged in order. Accordingly, the ball inserting work can be smoothly performed by the ball inserting mechanism.

(11) In the manufacturing apparatus for a ball bearing according to anyone of (8) or (10), the flow stopping jig is formed in a plate shape that is curved along the circumferential direction of the annular space and narrows toward an insertion direction into the annular space.

According to this manufacturing apparatus for a ball bearing, the movement of the balls in the annular space can be well restricted by the flow stopping jig formed in a plate shape that is curved along the circumferential direction of the annular space and narrows toward the insertion direction into the annular space.

(12) In the manufacturing apparatus for a ball bearing according to (11), the flow stopping jig includes a pair of side edges, and the pair of side edges are straight in a state of being developed in a plane and forms a curved shape that bulges outward in a state of being curved along the annular space.

According to this manufacturing apparatus for a ball bearing, when the flow stopping jig is inserted into or removed from the annular space, the side edges with the curved shape that bulges outward is in smooth contact with the balls in the annular space, so that a ball scratch due to the contact between the flow stopping jig and the balls can be avoided.

(13) A manufacturing apparatus for a ball bearing includes:

a workpiece holding table that is configured to hold an inner ring and an outer ring such that an annular space is formed between the inner ring and the outer ring;

an inner ring moving mechanism that is configured to move the inner ring with respect to the outer ring held on the workpiece holding table so as to form one region radially enlarged in the annular space;

an inclining operation mechanism that is configured to incline a vertical plane with respect to an axial direction of the inner ring and the outer ring held on the workpiece holding table;

a ball inserting mechanism that is configured to insert a plurality of balls into the one region along a circumferential direction of the annular space;

a flow stopping mechanism that is configured to place a flow stopping jig on a circumferentially outer side of the one region in the annular space so as to hold the plurality of balls which are inserted within the one region; and a ball separating member that includes a plurality of working arrows provided to protrude correspondingly to a number of the balls and is configured such that tip ends of the plurality of working arrows are sequentially inserted in an axial direction between the plurality of balls while removing the flow stopping jig from the annular space from a state of being placed in the annular space, so as to arrange the plurality of balls at equal intervals in the circumferential direction.

According to this manufacturing apparatus for a ball bearing, a ball inserting step of inserting the plurality of balls into one region along the circumferential direction of the annular space by the ball inserting mechanism and a ball separating step of arranging the balls at equal intervals in the circumferential direction by the working arrows of the ball separating member can be continuously performed. Accordingly, it is possible to omit the ball collecting step of collecting the balls fed into the annular space in the ball inserting step in one place. Therefore, operations for the ball arranging work in a ball bearing can be reduced to improve the workability. Further, ball rubbing in the ball collecting step can be avoided, so that the risk of a ball scratch can be reduced. In addition, steps from the ball inserting to the ball separating is continuously performed, so that the assembling can also be easily performed even for a ball bearing without a deformation margin in which the balls are held between the inner ring and the outer ring.

Further, the one region of the annular space may enlarged radially by the inner ring moving mechanism, so that the balls can be easily inserted into the annular space, and the workability can be further improved.

Further, the vertical plane with respect to the axial direction of the inner ring and the outer ring held on the workpiece holding table may be inclined by the inclining operation mechanism, so that the balls inserted in the one region of the annular space are moved downward due to their own weight and arranged in order. Accordingly, the ball inserting step can be smoothly performed by the ball inserting mechanism.

(14) A method for manufacturing a machine uses the manufacturing method for a ball bearing according to (7).

According to this method for manufacturing a machine, it is possible to easily manufacture a machine that uses a ball bearing in which balls are arranged at equal intervals in a circumferential direction in an annular space between an inner ring and an outer ring.

(15) A method for manufacturing a vehicle uses the manufacturing method for a ball bearing according to (7).

According to this method for manufacturing a vehicle, it is possible to easily manufacture a vehicle that uses a ball bearing in which balls are arranged at equal intervals in a circumferential direction in an annular space between an inner ring and an outer ring.

Advantageous Effects of Invention

According to the present invention, it is possible to improve the workability of the ball arranging work of placing and arranging the balls between the inner and outer rings at equal intervals.

BRIEF DESCRIPTION OF DRAWINGS

FIGS. 4A to 4D are views illustrating a flow stopping jig, wherein FIG. 4A is a front view, FIG. 4B is a side view, FIG. 4C is a bottom view, and FIG. 4D is a top view.

FIGS. 9A and 9B are views for illustrating a ball inserting step, wherein FIG. 9A is a perspective view of the workpiece before balls are inserted, and FIG. 9B is a perspective view of the workpiece after the balls are inserted.

FIGS. 10A and 10B are views illustrating placed states of balls in an annular space, wherein FIG. 10A is a plan view of the workpiece without a deformation margin in which the balls are held between the inner ring and the outer ring, and FIG. 10B is a plan view of the workpiece with a deformation margin in which the balls are held between the inner ring and the outer ring.

DESCRIPTION OF EMBODIMENTS

Hereinafter, embodiments of the present invention will be described in detail with reference to the drawings.

Figure 1:
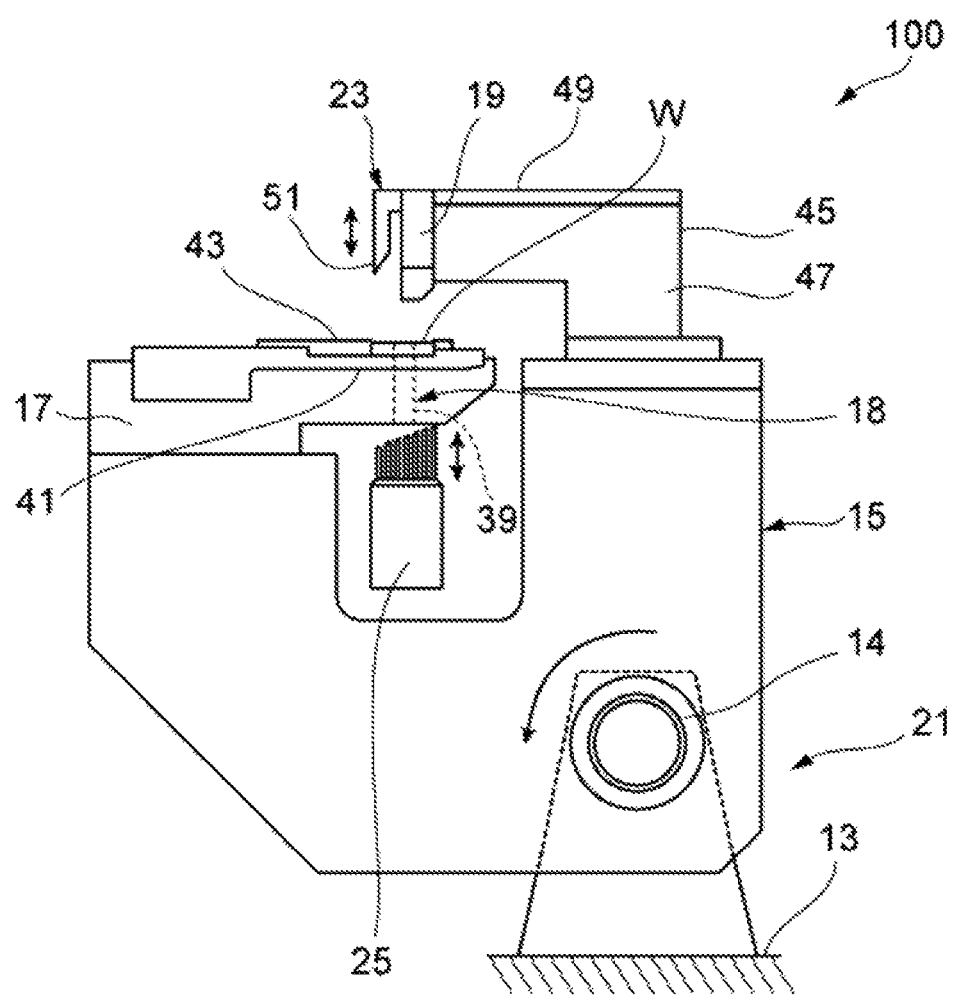
FIG. 1 is a schematic side view illustrating a configuration of a manufacturing apparatus for a ball bearing according to an embodiment of the present invention.
Figure 2:
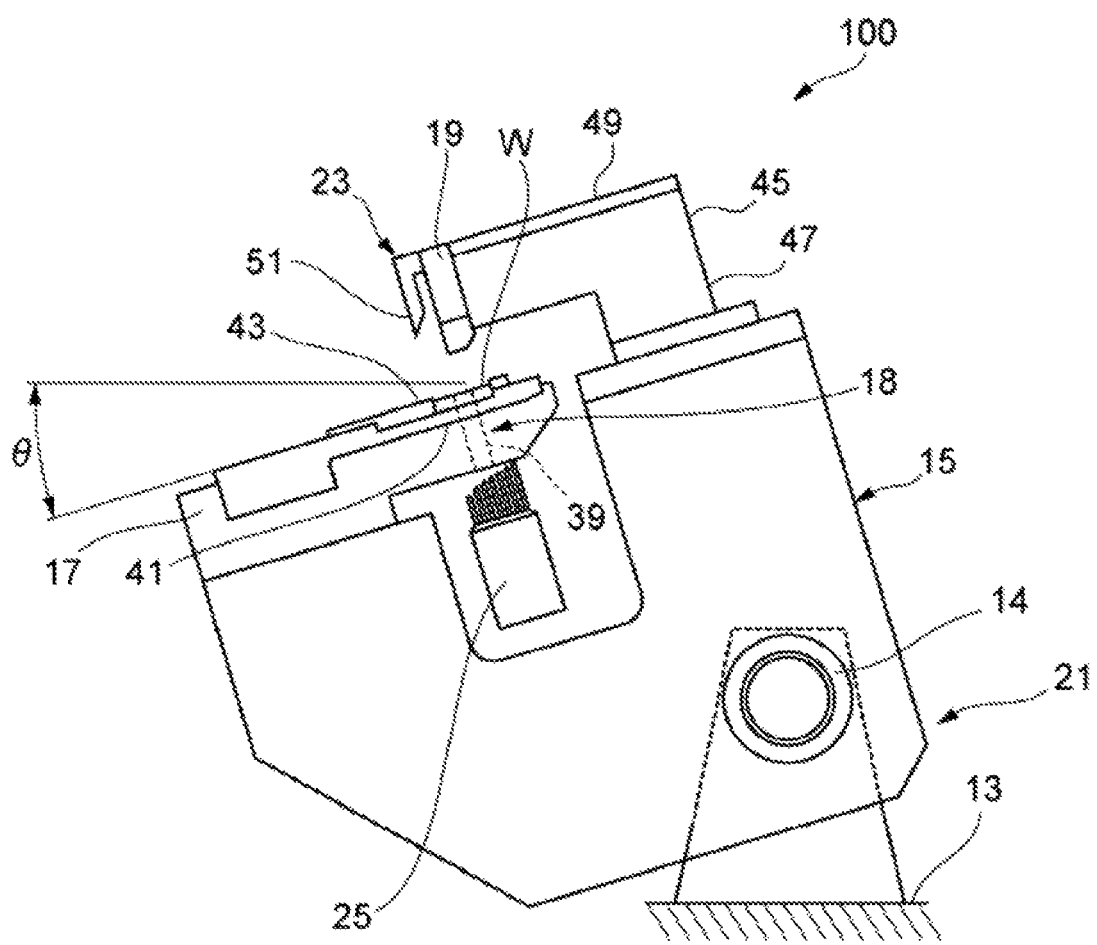
FIG. 2 is a schematic side view illustrating an operation of the manufacturing apparatus for a ball bearing shown in FIG. 1.

FIG. 1 is a schematic side view illustrating a configuration of a manufacturing apparatus for a ball bearing according to an embodiment of the present invention. FIG. 2 is a schematic side view illustrating an operation of the manufacturing apparatus for a ball bearing shown in FIG. 1.

A manufacturing apparatus 100 for a ball bearing according to the present embodiment includes a ball arranging unit 15 provided on a base 13 via a rotation shaft 14. The ball arranging unit 15 includes a workpiece holding table 17, an inner ring moving mechanism 18, a ball inserting mechanism 19, an inclining operation mechanism 21, a flow stopping mechanism 23, and a ball separating member 25.

The ball placement unit 15 is rotated by the inclining operation mechanism 21 between a horizontal state in which the workpiece holding table 17 provided on an upper portion of the ball placement unit 15 is horizontally arranged (state in FIG. 1), and an inclined state in which the workpiece holding table 17 is inclined at an inclination angle θ with respect to the horizontal plane (state in FIG. 2).

The workpiece holding table 17 holds a workpiece W at the upper portion of the ball placement unit 15. The workpiece holding table 17 includes a holding portion 41. The workpiece W is fitted into the holding portion 41 from an upper side. The workpiece holding table 17 is provided with a lock member 43 that moves in a direction toward and away from the holding portion 41. The workpiece W is pressed by the lock member 43 in a state of being fitted in the holding portion 41, so as to be fixed to the workpiece holding table 17.

Figure 3:
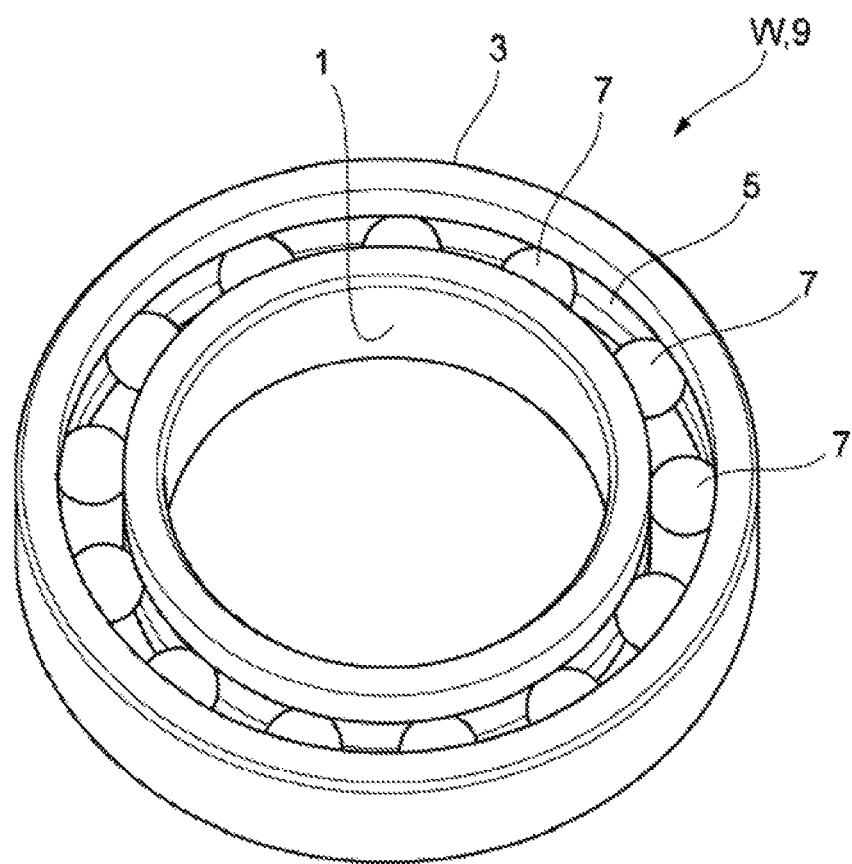
FIG. 3 is a perspective view of a workpiece that is a ball bearing.

As shown in FIG. 3, the workpiece W includes an inner ring 1, an outer ring 3, and a plurality of (thirteen in the illustrated example) balls 7 which a examples of rolling elements. The plurality of balls 7 are arranged at equal intervals in a circumferential direction in an annular space 5 between the inner ring 1 and the outer ring 3. The balls 7 are held by a cage (not shown). That is, the workpiece W is a ball bearing 9. The manufacturing apparatus 100 for a ball bearing is configured such that the plurality of balls 7 are inserted in the annular space 5 between the inner ring 1 and the outer ring 3, and the plurality of balls 7 are arranged at equal intervals in the circumferential direction.

As shown in FIGS. 1 and 2, the inner ring moving mechanism 18 has an inner ring support shaft 39. The inner ring support shaft 39 is inserted from a lower side into the inner ring 1 of the workpiece W held by the holding portion 41 of the workpiece holding table 17. The inner ring support shaft 39 is inclined along with an inclining operation of the ball placement unit 15 and is always placed coaxially with an axis of the workpiece W.

The ball inserting mechanism 19 is supported by a supporting unit 45 provided on an upper surface of the ball placement unit 15. The supporting unit 45 includes a column portion 47 standing on the upper surface of the ball placement unit 15, and an arm portion 49 extending from an upper end of the column portion 47 toward the workpiece holding table 17. The ball inserting mechanism 19 is supported at a tip end of the arm portion 49. The ball inserting mechanism 19 inserts (loads) the plurality of balls 7 into the annular space 5 (see FIG. 3) between the inner ring 1 and the outer ring 3 of the workpiece W held by the holding portion 41 of the workpiece holding table 17.

The flow stopping mechanism 23 is supported by the tip end of the arm portion 49 of the supporting unit 45. The flow stopping mechanism 23 includes a flow stopping jig 51 that moves up and down with respect to the workpiece holding table 17. When the flow stopping jig 51 is moved downward, a tip end portion of the flow stopping jig 51 is inserted into the annular space 5 (see FIG. 3) between the inner ring 1 and the outer ring 3 of the workpiece W held by the holding portion 41 of the workpiece holding table 17.

As shown in FIGS. 4A to 4D, the flow stopping jig 51 is formed in a plate shape that is curved along a circumferential direction of the annular space 5 and narrows toward an insertion direction (a lower side in FIGS. 4A, 4B) into the annular space 5.

Figure 5:
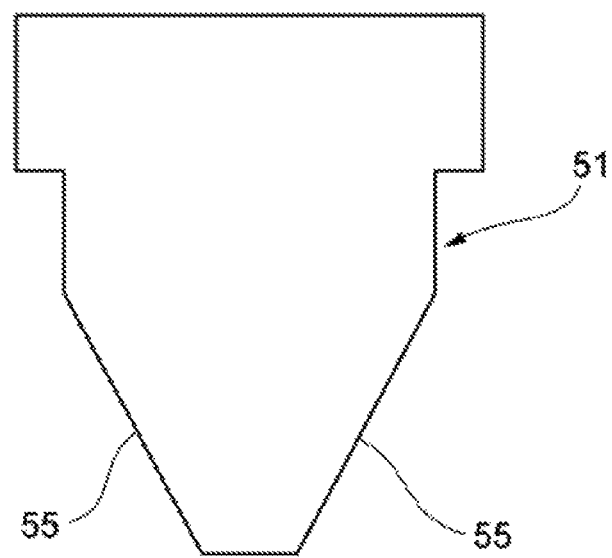
FIG. 5 is a developed view of the flow stopping jig.

FIG. 5 is a developed view of the flow stopping jig 51.

The flow stopping jig 51 has a pair of side edges 55 formed in a straight line in a state of being developed in a plane. The pair of side edges 55 of the flow stopping jig 51 has a curved shape that bulges outward in a state of being curved along the annular space 5. As shown in FIG. 4C, a length in the circumferential direction at a base portion of the flow stopping jig 51 is slightly smaller than a length in the circumferential direction of a space formed when the balls 7 inserted in the annular space 5 are collected in one region.

Figure 6:
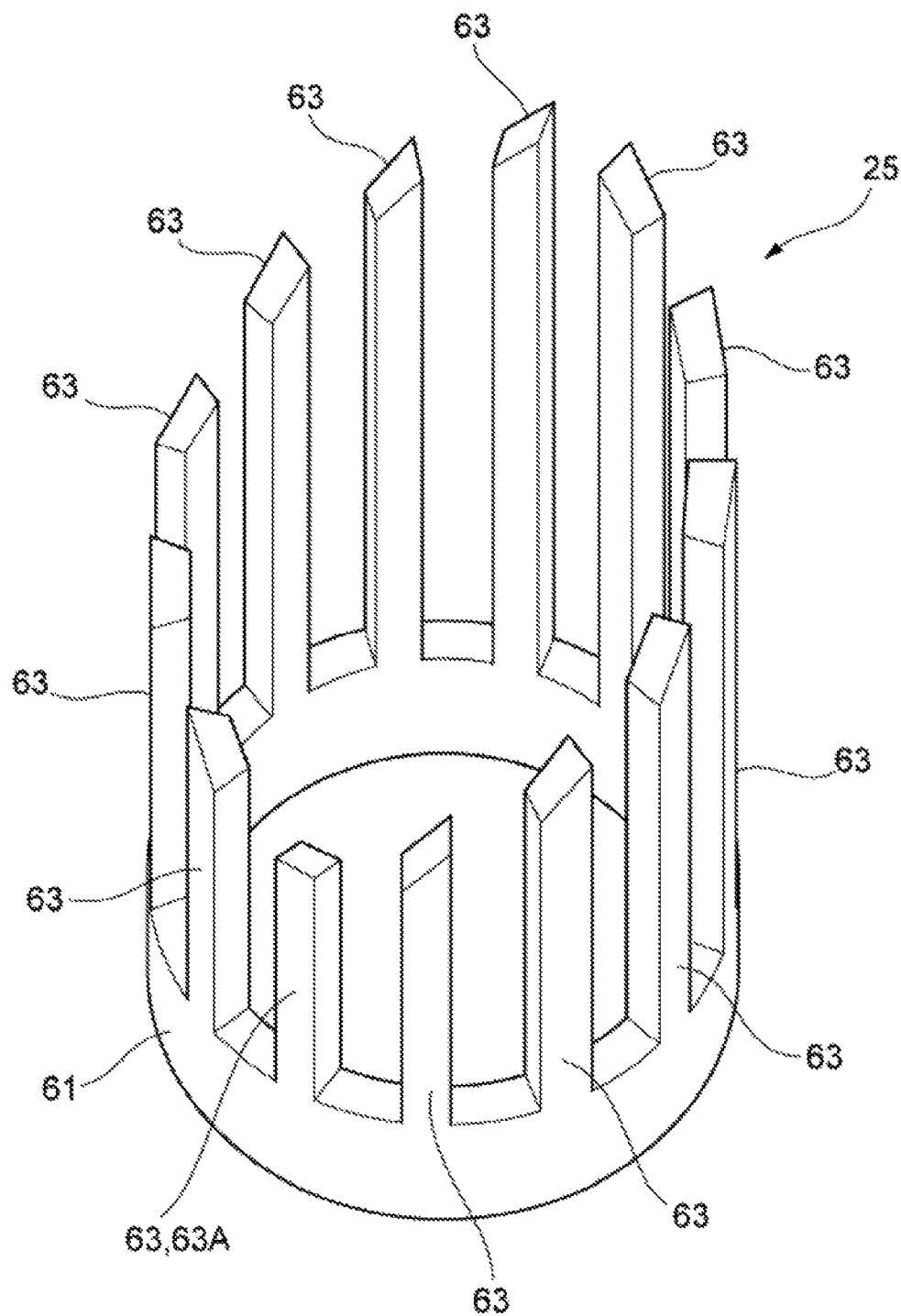
FIG. 6 is a perspective view of a ball separating portion.

FIG. 6 is a perspective view of the ball separating member 25.

The ball separating member 25 has a base portion 61 formed in an annular shape, and a plurality of working arrows 63 having different lengths. The working arrows 63 stand on the base portion 61 and arranged at equal intervals in the circumferential direction. The ball separating member 25 includes the same number of working arrows 63 as the number of balls 7 (thirteen in the present embodiment). One of the working arrows 63 is a reference working arrow 63A, and other working arrows 63 are arranged at symmetrical positions on both sides of the reference working arrow 63A in the circumferential direction. The reference working arrow 63A is shorter than the working arrows 63 on both sides. The axial lengths of the working arrows 63 arranged at symmetrical positions on both sides of the reference working arrow 63A in the circumferential direction gradually increases as the working arrows 63 are farther from the reference working arrow 63A.

A tip end portion of the reference working arrow 63A has a planar shape. Tip end portions of the working arrows 63 other than the reference working arrow 63A form an inclined surface extending toward a tip end side as the working arrows 63 are farther from the reference working arrow 63A in the circumferential direction.

The working arrows 63 arranged at symmetrical positions on both sides of the reference working arrow 63A in the circumferential direction have the same shape as each other, but may not necessarily have the same shape.

Figure 7:
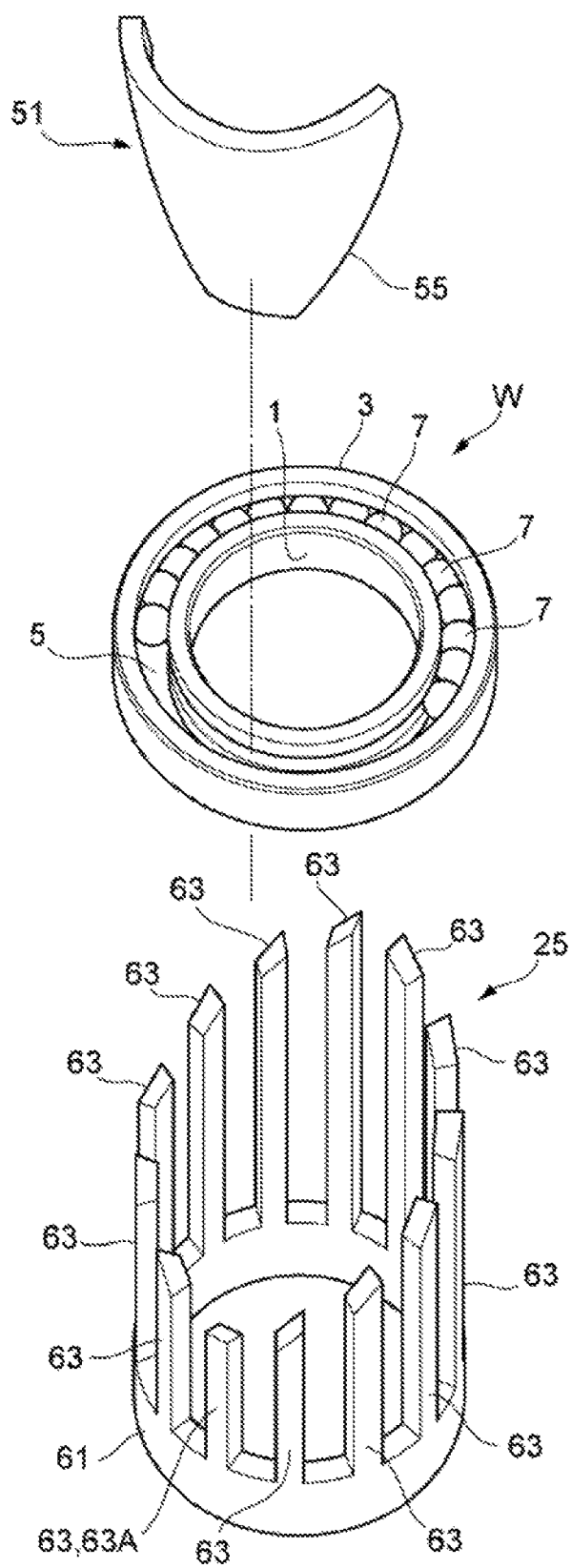
FIG. 7 is a perspective view for illustrating the arrangement of the flow stopping jig and the ball separating portion with respect to the workpiece.

FIG. 7 is a perspective view for illustrating the arrangement of the flow stopping jig 51 and the ball separating member 25 with respect to the workpiece W.

The flow stopping jig 51 of the flow stopping mechanism 23 (see FIG. 1 and FIG. 2) and the ball separating member 25 are arranged above and below the workpiece W which is held by the holding portion 41 of the workpiece holding table 17. In the example shown in FIG. 1 and FIG. 2, the flow stopping jig 51 is arranged above the workpiece W, and the ball separating member 25 is arranged below the workpiece W. In the inclined state (the state in FIG. 2) where the workpiece holding table 17 is inclined by the inclining operation mechanism 21, the reference working arrow 63A of the ball separating member 25 is arranged on a lower side of the inclination of the workpiece W. Incidentally, the ball separating member 25 may be arranged above the workpiece W, and the flow stopping jig 51 may be arranged below the workpiece W.

Figure 8:
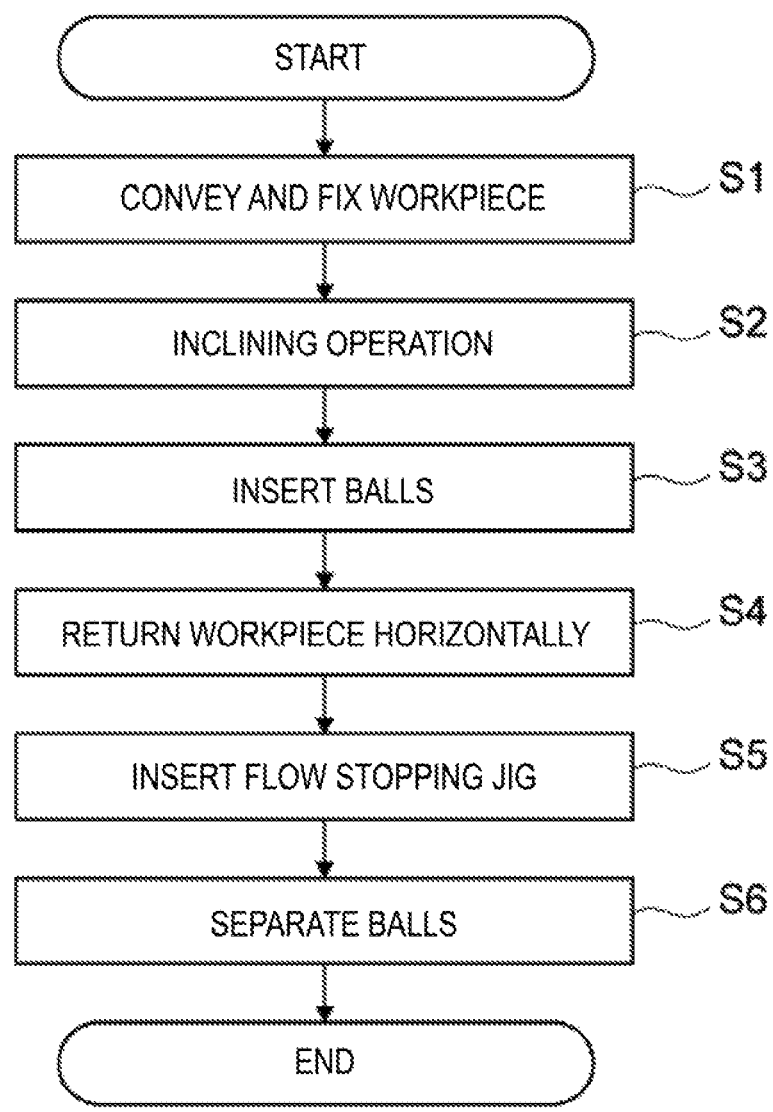
FIG. 8 is a flow chart for illustrating a ball arranging work.

Next, a case of manufacturing a ball bearing by the manufacturing apparatus 100 for a ball bearing while inserting balls into the workpiece W will be described step by step according to the flowchart shown in FIG. 8.

(Workpiece Fixing Step)

The workpiece W is conveyed to the ball placement unit 15 in a horizontal state and held by the holding portion 41 of the workpiece holding table 17 (step S1). At this time, the inner ring support shaft 39 is inserted into and supported by an inner periphery of the inner ring 1, and the outer ring 3 is fixed to the holding portion 41 by the lock member 43.

(Inclining Operation Step)

The ball placement unit 15 is inclined by the inclining operation mechanism 21 to the inclined state where the workpiece holding table 17 is inclined at the inclination angle θ with respect to the horizontal plane (step S2). At this time, the inner ring support shaft 39 of the inner ring moving mechanism 18 is inclined along with the inclining operation of the ball placement unit 15. Further, a center axis of the inner ring support shaft 39 of the inner ring moving mechanism 18 is arranged at a position displaced to a lower side (left side in FIG. 2) of the inclination in a plane perpendicular to a center axis of the workpiece W. Accordingly, the center of the inner ring 1 is decentered to the lower side of the inclination with respect to the center of the outer ring 3. Therefore, the annular space 5 between the inner ring 1 and the outer ring 3 is narrower at the lower side of the inclination and is wider at an upper side of the inclination.

(Ball Inserting Step)

Figure 9A:
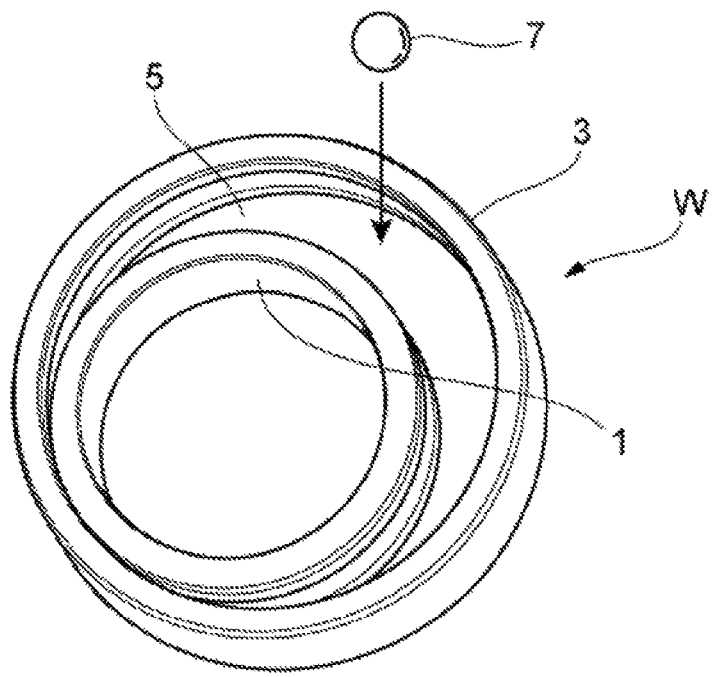
Figure 9B:
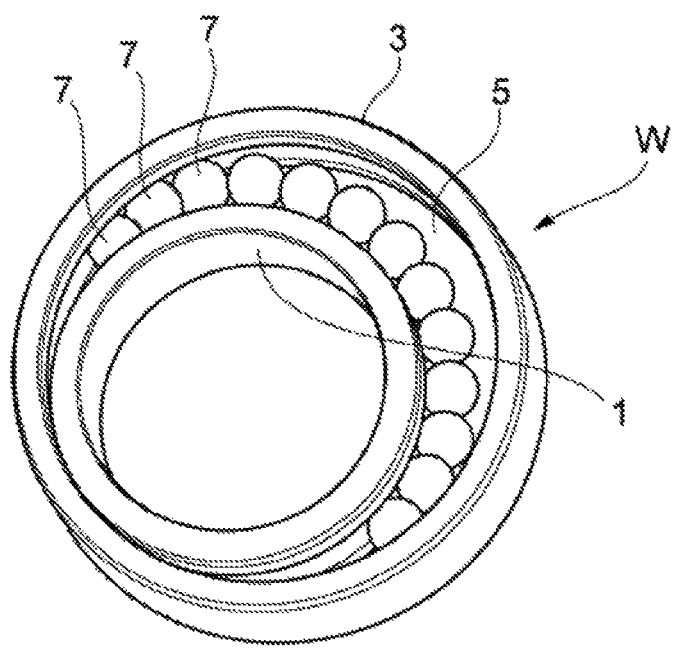

FIGS. 9A and 9B are views for illustrating a ball inserting step.

As shown in FIG. 9A, a ball 7 is inserted into the annular space 5 between the inner ring 1 and the outer ring 3 held by the workpiece holding table 17 (see FIG. 1 and FIG. 2) from the ball inserting mechanism 19 (step S3). At this time, the annular space 5 is enlarged at the upper side of the inclination, so that the balls 7 can be easily and smoothly inserted into the annular space 5 by the ball inserting mechanism 19. Further, the balls 7 move to the left and right without staying at an inserted position due to its own weight. Therefore, the balls 7 that are already inserted do not get in the way when inserting other balls 7. As shown in FIG. 9B, the balls 7 inserted in the annular space 5 are placed in a state of being collected in the enlarged region on the upper side of the inclination. That is, the balls 7 inserted in the annular space 5 are placed in a state of being collected in one region along the circumferential direction of the annular space 5.

(Horizontal Operation Step)

The ball placement unit 15 is returned to the horizontal state (the state in FIG. 1) in which the workpiece holding table 17 is horizontal by the inclining operation mechanism 21 (step S4). At this time, the center axis of the inner ring support shaft 39 is moved to a position coaxial with the axis of the workpiece W. Accordingly, the centers of the outer ring 3 and the inner ring 1 coincide with each other, and the annular space 5 has an equal gap over the circumferential direction.

Figure 10A:
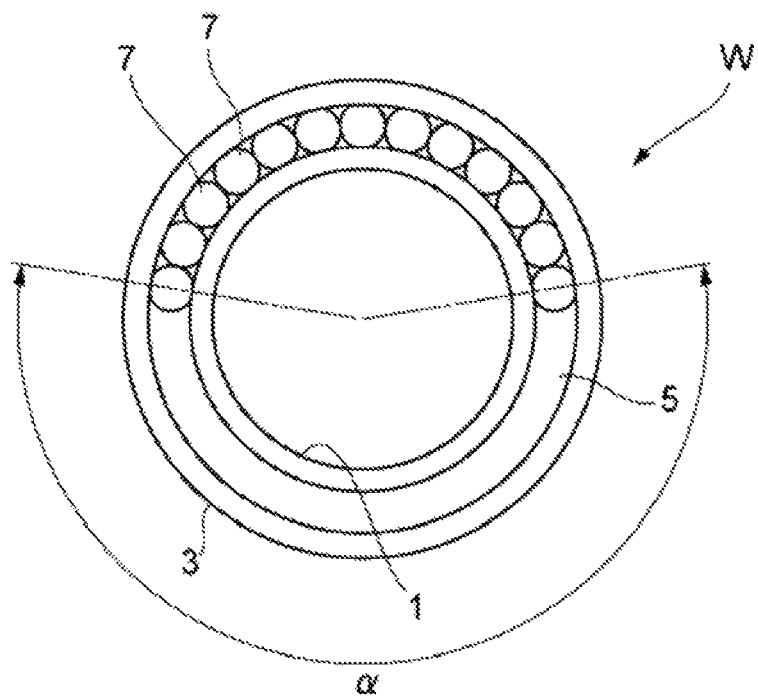
Figure 10B:
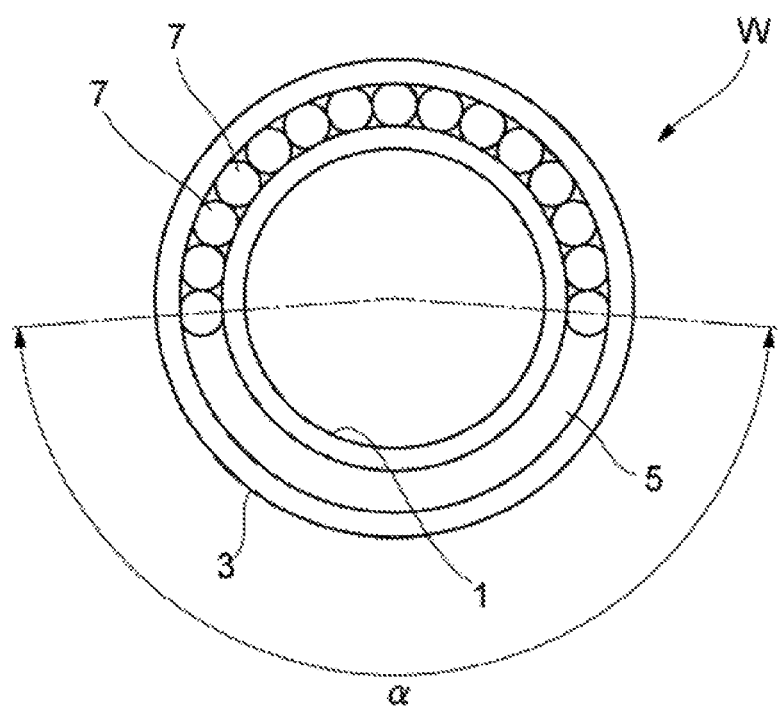

Then, as shown in FIG. 10A, in the annular space 5, the balls 7 are collected in one region, and a circumferentially outer side of the one area becomes a space portion which is not provided with the balls 7. In a workpiece without a deformation margin in which the balls 7 are held between the inner ring 1 and the outer ring 3, a region a of the space portion is in a range of 180° or larger. As shown in FIG. 10B, in a workpiece W with a deformation margin in which the balls 7 are held in grooves of the inner ring 1 and the outer ring 3, a region a of the space portion without the ball 7 on the circumferentially outer side of the one region is in a range of less than 180°.

(Flow Stopping Step)

Figure 11:
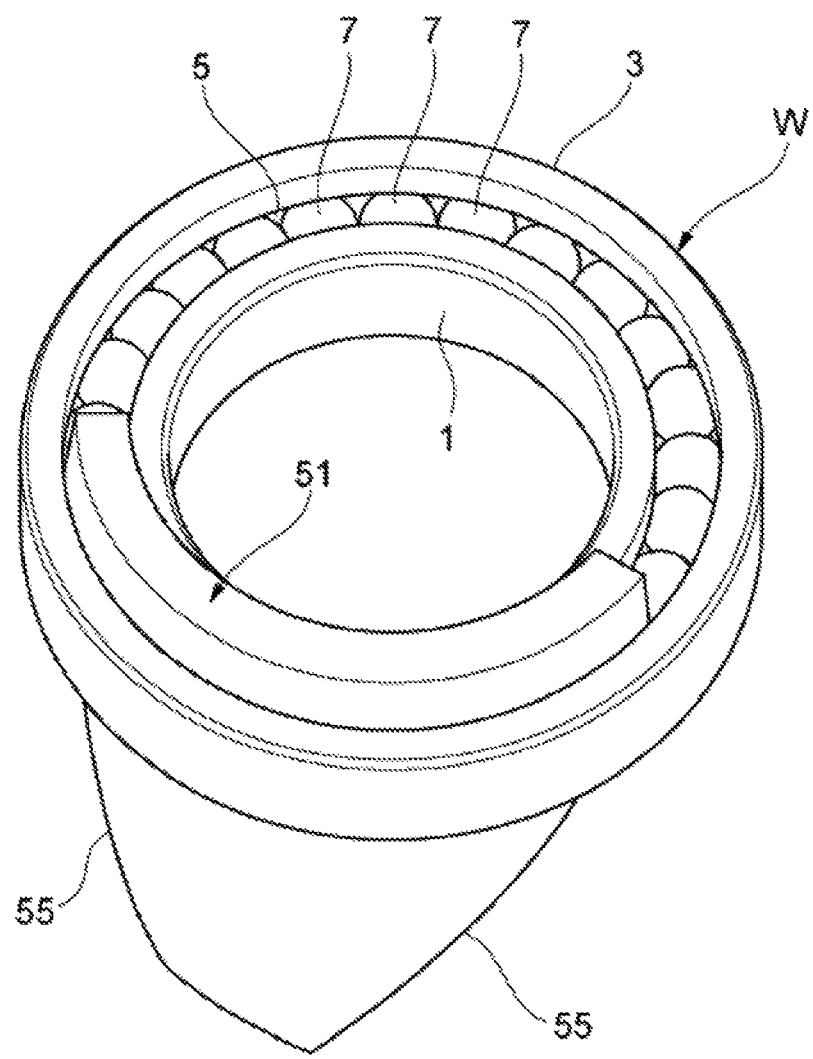
FIG. 11 is a perspective view of the workpiece and the flow stopping jig for illustrating a flow stopping step.

FIG. 11 is a perspective view of the workpiece W and the flow stopping jig 51 for illustrating a flow stopping step.

The flow stopping jig 51 of the flow stopping mechanism 23 is inserted along an axial direction of the inner ring 1 and the outer ring 3 from the upper side into the space portion without the ball 7 in the annular space 5 of the workpiece W (step S5). Here, when the centers of the outer ring 3 and the inner ring 1 are made to coincide with each other, the balls 7 collected in the one region can roll and move to the space portion without the ball 7. However, by inserting and placing the flow stopping jig 51 into the annular space 5, the movement of the loaded balls 7 can be restricted, and the balls 7 can be held within the one region. The operation of inserting the flow stopping jig 51 into the annular space 5 is performed at the same time with the horizontal operation in which the ball placement unit 15 is returned horizontally and the inner ring 1 is moved to align the centers of the outer ring 3 and the inner ring 1. Alternatively, the operation of inserting may be performed after the ball placement unit 15 is returned horizontally.

(Ball Separating Step)

Figure 12:
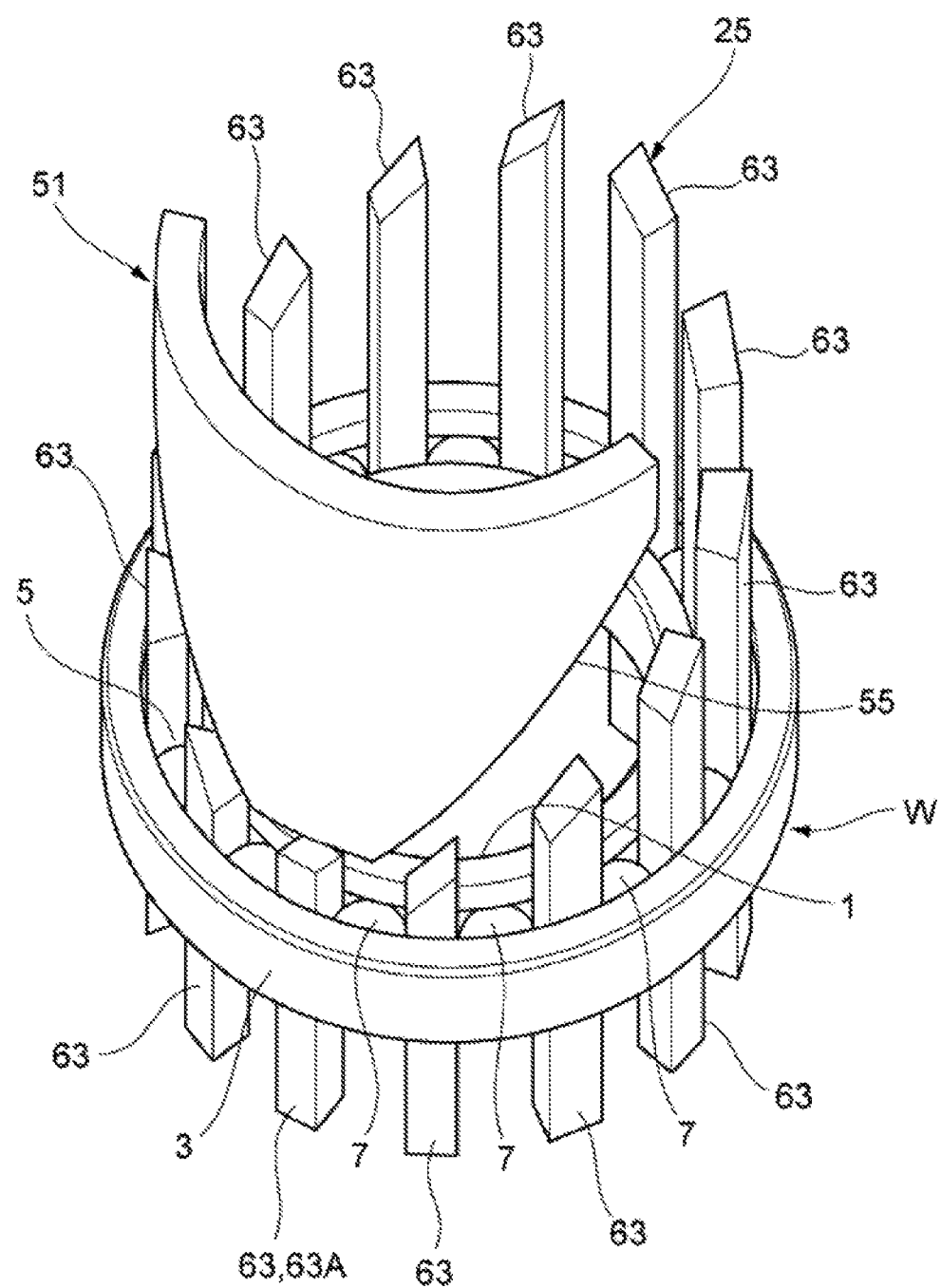
FIG. 12 is a perspective view of the workpiece, the flow stopping jig, and the ball separating portion for illustrating a ball separating step.

FIG. 12 is a perspective view of the workpiece W, the flow stopping jig 51, and the ball separating member 25 for illustrating a ball separating step.

The ball separating member 25 is raised with respect to the workpiece W, and the plurality of working arrows 63 are inserted into the annular space 5 while the flow stopping jig 51 is removed from the annular space 5 from a state of being arranged in the annular space 5. Accordingly, the tip ends of the plurality of protruding working arrows 63 corresponding to the number of the balls 7 are sequentially inserted in the axial direction between the plurality of balls 7 placed in the annular space 5, so that the plurality of balls 7 are arranged at equal intervals in the circumferential direction (step S6).

Figure 13:
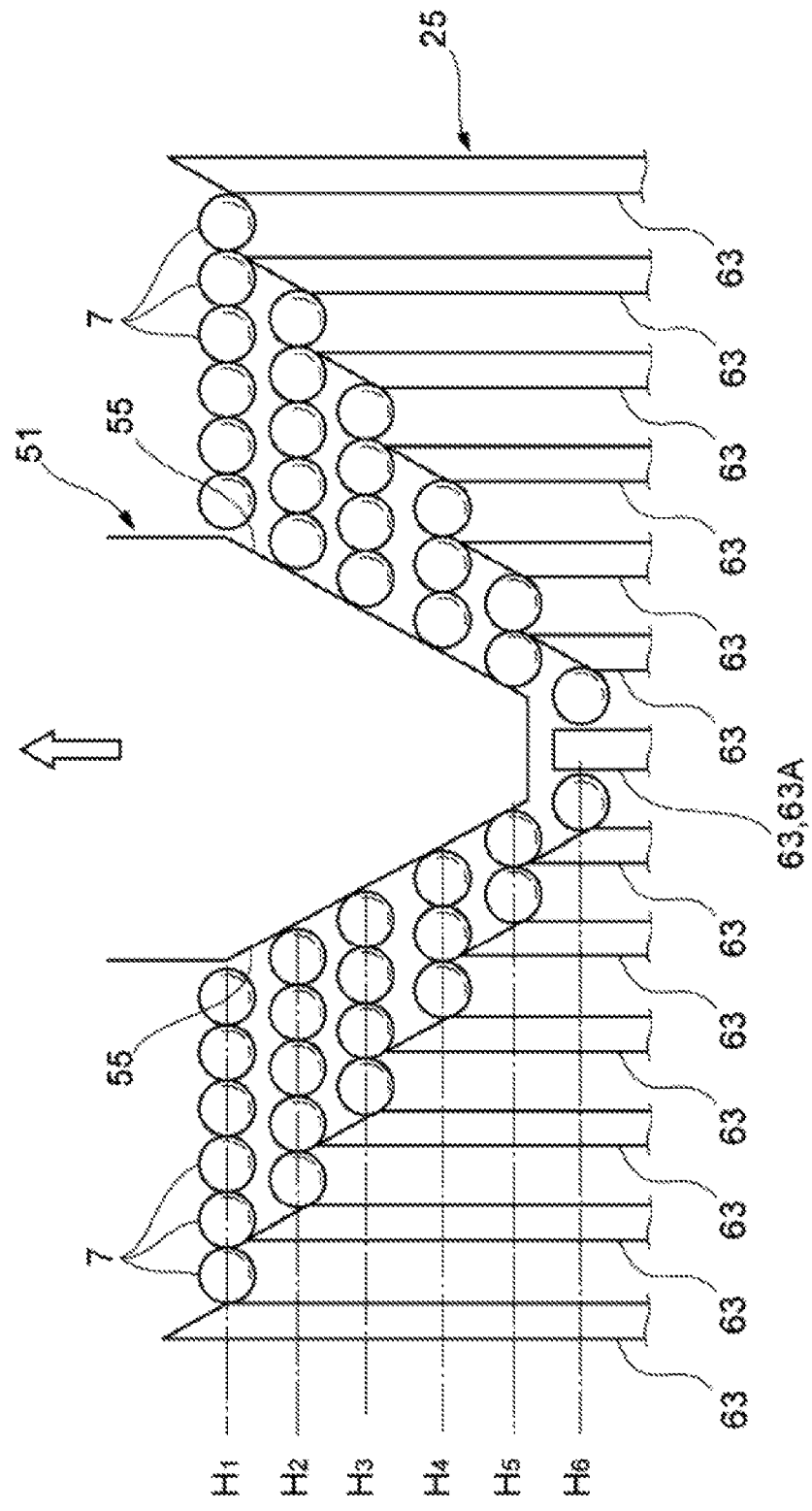
FIG. 13 is a schematic view illustrating movement of the balls in the ball separating step.

FIG. 13 is a schematic view illustrating movement of the balls 7 in the ball separating step.

Raising speeds of the flow stopping jig 51 and the ball separating member 25 are substantially the same. Therefore, when the flow stopping jig 51 and the ball separating member 25 are raised, a relative position between the flow stopping jig 51 and the ball separating member 25 would not change. That is, relative positions of the balls 7 with respect to the flow stopping jig 51 and the ball separating member 25 change.

In the example shown in FIG. 13, positions of the balls 7 at the time of inserting the working arrows 63 of the ball separating member 25 into the annular space 5 while removing the flow stopping jig 51 arranged in the annular space 5 are shown stepwise at height positions $H_1$ to $H_6$. The height positions $H_1$ to $H_6$ indicate the relative positions of the balls 7 with respect to the flow stopping jig 51 and the ball separating member 25.

At the start of the ball separating step, the relative positions of the balls 7 with respect to the flow stopping jig 51 and the ball separating member 25 are in a positional relationship at the height position $H_1$. That is, the flow stopping jig 51 is inserted into the space portion of the annular space 5 without the ball 7.

When the relative positions of the balls 7 with respect to the flow stopping jig 51 and the ball separating member 25 is the height position $H_1$, a ball 7 (the seventh ball located at the circumferential center among the thirteen balls in FIG. 10A) gets in between two longest working arrows 63 (two working arrows 63 at the left and right ends in FIG. 13) as the ball separating member 25 raises. Then, the remaining twelve balls 7 are pushed out toward the flow stopping jig 51 side from the two longest working arrows 63.

Among the plurality of balls 7 at the height positions $H_1$ to $H_6$, the balls 7 separated to the circumferentially outer side (left and right sides in FIG. 13) of the working arrows 63 are not shown in FIG. 13.

From this state, both the flow stopping jig 51 and the ball separating member 25 raise as shown by an arrow in FIG. 13.

When the relative positions of the balls 7 with respect to the flow stopping jig 51 and the ball separating member 25 change from the height position $H_1$ to $H_2$, as the ball separating member 25 raises, two second longest working arrows 63 (two second working arrows 63 counting from the left and right ends respectively in FIG. 13) get in between the balls 7 at both ends of the height position $H_1$ in FIG. 13, and the remaining ten balls 7 are pushed out to the flow stopping jig 51 side.

When the relative positions of the balls 7 with respect to the flow stopping jig 51 and the ball separating member 25 change from the height position $H_2$ to $H_3$, two third longest working arrows 63 (two third working arrows 63 counting from the left and right ends respectively in FIG. 13) get in between the balls 7, and the remaining eight balls 7 are pushed out to the flow stopping jig 51 side.

When the relative positions of the balls 7 with respect to the flow stopping jig 51 and the ball separating member 25 change from the height position $H_3$ to $H_4$, two fourth longest working arrows 63 (two fourth working arrows 63 counting from the left and right ends respectively in FIG. 13) get in between the balls 7, and the remaining six balls 7 are pushed out to the flow stopping jig 51 side.

When the relative positions of the balls 7 with respect to the flow stopping jig 51 and the ball separating member 25 change from the height position $H_4$ to $H_5$, two fifth longest working arrows 63 (two fifth working arrows 63 counting from the left and right ends respectively in FIG. 13) get in between the balls 7, and the remaining four balls 7 are pushed out to the flow stopping jig 51 side.

At the last, when the relative positions of the balls 7 with respect to the flow stopping jig 51 and the ball separating member 25 change from the height position $H_5$ to $H_6$, two shortest working arrows 63 (two sixth working arrows 63 counting from the left and right ends respectively in FIG. 13) get in between the balls 7, and the remaining two balls 7 are pushed out to the flow stopping jig 51 side.

At this time, the two balls 7 in contact with the pair of side edges 55 of the flow stopping jig 51 at the height position $H_5$ are come into contact with the reference working arrow 63A. Then, these two balls 7 get in between the reference working arrow 63A and the two shortest working arrows 63A.

Figure 14:
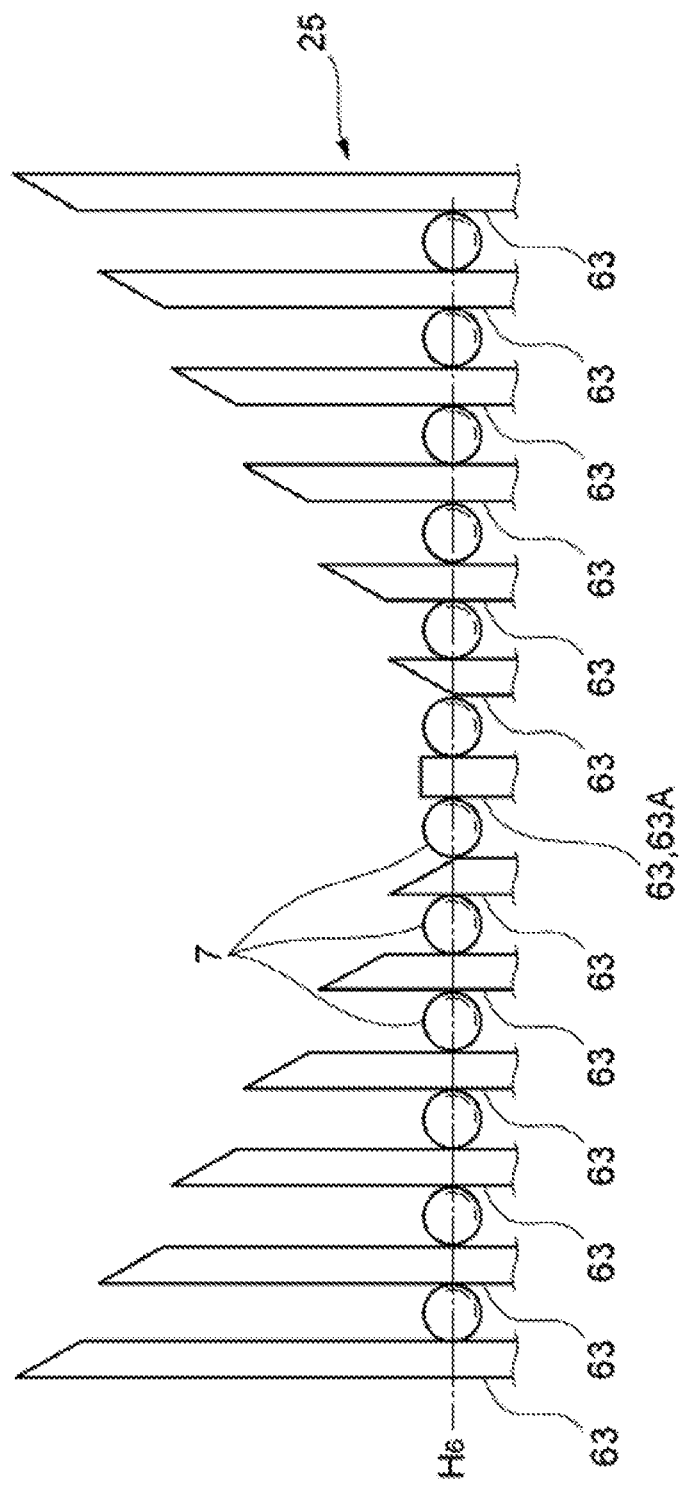
FIG. 14 is a schematic view illustrating a state in which the balls are arranged by the ball separating step.

At the last, as shown in FIG. 14, the working arrows 63 of the ball separating member 25 get in between respective balls 7 placed in the annular space 5, and the plurality of balls 7 are arranged at equal intervals in the circumferential direction.

Thereafter, a cage for holding the balls 7 is fitted into the annular space 5, so that the balls 7 are arranged at equal intervals and rollably held in the ball bearing.

As described above, according to the ball arranging method for a ball bearing of the present embodiment, the ball inserting step of inserting a plurality of balls 7 into one region along the circumferential direction of the annular space 5 and the ball separating step of arranging the balls 7 at equal intervals in the circumferential direction by the working arrows 36 are continuously performed. Therefore, it is possible to omit the ball collecting step of collecting the balls 7 inserted into the annular space 5 in the ball inserting step in one place. Further, operations for the ball arranging work in a ball bearing can be reduced to improve the workability. Further, ball rubbing in the ball collecting step can be avoided, so that the risk of a ball scratch can be reduced. In addition, steps from the ball separating step to the ball inserting step are continuously performed, so that the assembling can be easily performed even for a ball bearing without a deformation margin in which the balls are held between the inner ring and the outer ring.

In the ball inserting step, the inner ring 1 is moved to a side opposite to the one region with respect to the outer ring 3, and the annular space 5 is enlarged radially in one region before the balls 7 are inserted. Therefore, the balls can be smoothly inserted into the annular space 5.

In the flow stopping step, the flow stopping jig 51 is inserted into the annular space 5 along the axial direction of the inner ring 1 and the outer ring 3. Therefore, the movement of the inserted balls 7 collected in one region can be restricted by the flow stopping jig 51 so as to suppress the spread of the balls 7. Accordingly, the plurality of balls 7 inserted into the annular space 5 can be separated in a state of being held in one place without spreading.

In the ball loading step, the inner ring 1 and the outer ring 3 are inclined with respect to the horizontal plane with one region upward. Therefore, the balls 7 inserted in the one region of the annular space 5 are moved downward due to their own weight and arranged in order. Accordingly, the ball inserting step can be smoothly performed.

The ball inserting step and the ball separating step can be continuously performed without horizontally conveying the inner ring 1 and the outer ring 3. Therefore, the spread of the balls 7 during the horizontal conveyance can be avoided, and the workability can be improved.

According to the manufacturing method for a ball bearing in which the balls 7 are arranged at equal intervals in the annular space 5 between the inner ring 1 and the outer ring 3 by using the ball arranging method described above, the ball bearing in which balls 7 are arranged at equal intervals in the circumferential direction in the annular space 5 between the inner ring 1 and the outer ring 3 can be easily manufactured.

According to the manufacturing apparatus 100 for a ball bearing of the present embodiment, the ball inserting step of inserting the plurality of balls 7 into one region along the circumferential direction of the annular space 5 by the ball loading mechanism 19 and the ball separating step of arranging the balls 7 at equal intervals in the circumferential direction by the working arrows 36 of the ball separating member 25 can be continuously performed. Accordingly, it is possible to omit the ball collecting step of collecting the balls 7 inserted into the annular space 5 in the ball inserting step in one place. Therefore, operations for the ball arranging work in a ball bearing can be reduced to improve the workability. Further, ball rubbing in the ball collecting step can be avoided, so that the risk of a ball scratch can be reduced. In addition, steps from the ball separating step to the ball inserting step are continuously performed, so that the assembling can be easily performed even fora ball bearing without a deformation margin in which the balls are held between the inner ring and the outer ring.

The inner ring 1 is moved to a side opposite to the one region with respect to the outer ring 3 by the inner ring moving mechanism 18, and the annular space 5 is enlarged radially in the one region, so that the balls can be easily inserted into the annular space 5, and the workability can be further improved.

A vertical plane with respect to the axial direction of the inner ring 1 and the outer ring 3 held on the workpiece holding table 17 is inclined by the inclining operation mechanism 21, so that the balls 7 inserted in the one region of the annular space 5 are moved downward due to their own weight and arranged in order. Accordingly, the ball inserting step can be smoothly performed by the ball inserting mechanism 19.

The flow stopping jig 51 is formed in a plate shape that is curved along the circumferential direction of the annular space 5 and narrows toward the insertion direction into the annular space 5. Accordingly, the movement of the balls 7 in the annular space 5 can be well restricted by the flow stopping jig 51.

The pair of side edges 55 of the flow stopping jig 51 are straight in a state of being developed in a plane and forms a curved shape that bulges outward in a state of being curved along the annular space 5. Therefore, when the flow stopping jig 51 is inserted into or removed from the annular space 5, the pair of side edges 55 with the curved shape that bulges outward is in smooth contact with the balls 7 in the annular space 5, so that a ball scratch due to the contact between the flow stopping jig 51 and the balls 7 can be avoided.

The present invention is not limited to the above-mentioned embodiment, but modifications and applications made by one skilled in the art based on mutual combination of the configurations of the embodiments, description in the specification, and well-known art, is also within the scope and protection of the present invention.

The manufacturing method for a rolling bearing described above is applicable also to the manufacturing of various machines (including one using manual power) including a rolling bearing. For example, the inventive concept of the present invention is also applicable to a linear motion device such as a linear motion guide apparatus including a rail, a slider or the like, a ball screw apparatus or a screw apparatus including a screw shaft, a nut or the like, an apparatus combining a linear motion guide bearing and a ball screw, or an actuator including an XY table or the like.

Further, the inventive concept of the present invention is also applicable to a steering apparatus such as a steering column, a universal joint, an intermediate gear, a rack and pinion, an electric power steering apparatus, a worm reducer, a torque sensor or the like.

The inventive concept of the present invention can be widely applicable to the above-mentioned machine, vehicles including a steering device, a machine tool, housing equipment or the like.

A machine, vehicle or the like obtained as described above can be configured at low-cost and with a high-grade structure than those in the related art.

This application is based on Japanese Patent Application No. 2018-103734 filed on May 30, 2018, the contents of which are incorporated herein by reference.

REFERENCE SIGNS LIST 1 inner ring
3 outer ring
5 annular space
7 ball
9 ball bearing
17 workpiece holding table
18 inner ring moving mechanism
19 ball inserting mechanism
21 inclining operation mechanism
23 flow stopping mechanism
25 ball separating member
51 flow stopping jig
55 side edge
63 working arrow
100 manufacturing apparatus for ball bearing

The invention claimed is:

1. A ball arranging method for a ball bearing, comprising:
a ball inserting step of inserting a plurality of balls into one region along a circumferential direction of an annular space formed between an inner ring and an outer ring;
a flow stopping step of placing a flow stopping jig on a circumferentially outer side of the one region in the annular space so as to hold the inserted plurality of balls within the one region; and
a ball separating step of sequentially inserting, in an axial direction, tip ends of a plurality of working arrows provided to protrude correspondingly to a number of the balls between the plurality of balls while the flow stopping jig is removed from the annular space from a state of being placed in the annular space, so as to arrange the plurality of balls at equal intervals in the circumferential direction,
wherein the ball inserting step, the flow stopping step and the ball separating step are performed in this order.

2. The ball arranging method according to claim 1,
wherein in the ball inserting step, the inner ring is moved to a side opposite to the one region with respect to the outer ring, so that the annular space is enlarged radially in the one region before the balls are inserted.

3. The ball arranging method according to claim 1,
wherein in the flow stopping step, the flow stopping jig is inserted into the annular space along the axial direction of the inner ring and the outer ring.

4. The ball arranging method according to claim 1,
wherein in the ball inserting step, the inner ring and the outer ring are inclined with respect to a horizontal plane with the one region upward.

5. The ball arranging method according to claim 1,
wherein steps from the ball inserting step to the ball separating step are continuously performed without horizontally conveying the inner ring and the outer ring.

6. A manufacturing method for a ball bearing in which a plurality of balls are arranged at equal intervals in an annular space between an inner ring and an outer ring by using the ball arranging method according to claim 1.

7. A method for manufacturing a machine that uses the manufacturing method for a ball bearing according to claim 6.

8. A method for manufacturing a vehicle that uses the manufacturing method for a ball bearing according to claim 6.

9. The ball arranging method according to claim 1,
wherein in the ball inserting step, the inner ring and the outer ring are inclined with respect to a horizontal plane with the one region upward and the inner ring is moved to a side opposite to the one region with respect to the outer ring, so that the annular space is enlarged radially in the one region before the balls are inserted; and
wherein the flow stopping jig is placed in the annular space at the same time with a horizontal operation in which the inner ring and the outer ring are returned horizontally and the inner ring is moved to align the centers of the outer ring and the inner ring.

10. The ball arranging method according to claim 1,
wherein the ball inserting step to the ball separating step are performed continuously and at the same position.

11. The ball arranging method according to claim 1,
wherein the flow stopping jig is inserted from an upper side into the annular space and the plurality of working arrows is inserted into the annular space from a lower side, and
wherein the lower side is arranged opposite to the upper side.

12. A ball arranging method for a ball bearing, comprising:
decentering a center of an inner ring with respect to a center of an outer ring to enlarge one region along a circumferential direction of an annular space formed between the inner ring and the outer ring;
inclining the outer ring and the inner ring with a side opposite to a side on which the inner ring is decentered upward, and inserting a plurality of balls into the one region of the annular space;
inserting a flow stopping jig into the annular space to hold the plurality of balls within the one region while returning the outer ring and the inner ring horizontally; and
inserting a plurality of working arrows provided to protrude correspondingly to a number of the balls, between the plurality of balls while removing the flow stopping jig from the annular space.

13. A manufacturing method for a ball bearing in which a plurality of balls are arranged at equal intervals in an annular space between an inner ring and an outer ring by using the ball arranging method according to claim 12.

14. A method for manufacturing a machine that uses the manufacturing method for a ball bearing according to claim 13.

15. A method for manufacturing a vehicle that uses the manufacturing method for a ball bearing according to claim 13.

16. A manufacturing apparatus for a ball bearing, comprising:
a workpiece holding table that is configured to hold an inner ring and an outer ring such that an annular space is formed between the inner ring and the outer ring, wherein a plurality of balls are inserted into one region along a circumferential direction of the annular space formed between the inner ring and the outer ring which are held by the workpiece holding table;
a flow stopping mechanism that includes a flow stopping jig and is configured to move and place the flow stopping jig on a circumferentially outer side of the one region in the annular space such that the flow stopping jig contacts balls at both ends of the plurality of balls in the circumferential direction to hold the plurality of balls which are inserted within the one region; and
a ball separating member that includes a plurality of working arrows provided to protrude correspondingly to a number of the balls and is configured such that tip ends of the plurality of working arrows are sequentially inserted in an axial direction between the plurality of balls while removing the flow stopping jig from the annular space from a state of being placed in the annular space, so as to arrange the plurality of balls at equal intervals in the circumferential direction.

17. The manufacturing apparatus for a ball bearing according to claim 16, further comprising:
an inner ring moving mechanism that includes an inner ring support member which supports the inner ring, the inner ring moving mechanism being configured to move the inner ring support member to move the inner ring to a side opposite to the one region with respect to the outer ring so as to enlarge the annular space radially in the one region.

18. The manufacturing apparatus for a ball bearing according to claim 16, further comprising:
an inclining operation mechanism that includes a rotation shaft about which the workpiece holding table is rotated and is configured to rotate the workpiece holding table about the rotation shaft to incline a vertical plane with respect to an axial direction of the inner ring and the outer ring held on the workpiece holding table.

19. The manufacturing apparatus for a ball bearing according to claim 17,
wherein the flow stopping jig is formed in a plate shape that is curved along the circumferential direction of the annular space and narrows toward an insertion direction into the annular space.

20. The manufacturing apparatus for a ball bearing according to claim 19,
wherein the flow stopping jig includes a pair of side edges, and the pair of side edges are straight in a state of being developed in a plane and forms a curved shape that bulges outward in a state of being curved along the annular space.

21. A manufacturing apparatus for a ball bearing, comprising:
a workpiece holding table that is configured to hold an inner ring and an outer ring such that an annular space is formed between the inner ring and the outer ring;
an inner ring moving mechanism that includes an inner ring support member which supports the inner ring, the inner ring moving mechanism being configured to move the inner ring support member to move the inner ring with respect to the outer ring held on the workpiece holding table so as to form one region radially enlarged in the annular space, wherein a plurality of balls are inserted into the one region along a circumferential direction of the annular space;
an inclining operation mechanism that includes a rotation shaft about which the workpiece holding table is rotated and is configured to rotate the workpiece holding table about the rotation shaft to incline a vertical plane with respect to an axial direction of the inner ring and the outer ring held on the workpiece holding table;
a flow stopping mechanism that includes a flow stopping jib and is configured to move and place the flow stopping jig on a circumferentially outer side of the one region in the annular space such that the flow stopping jig contacts balls at both ends of the plurality of balls in the circumferential direction to hold the plurality of balls which are inserted within the one region; and
a ball separating member that includes a plurality of working arrows provided to protrude correspondingly to a number of the balls and is configured such that tip ends of the plurality of working arrows are sequentially inserted in an axial direction between the plurality of balls while removing the flow stopping jig from the annular space from a state of being placed in the annular space, so as to arrange the plurality of balls at equal intervals in the circumferential direction.

\* \* \* \* \*